(12) United States Patent
Rooks

(10) Patent No.: US 8,428,991 B1
(45) Date of Patent: Apr. 23, 2013

(54) SYSTEM AND METHOD FOR SCHEDULING

(76) Inventor: Dennis Brian Rooks, Savannah, GA (US)

(*) Notice: Subject to any disclaimer, the term of this patent is extended or adjusted under 35 U.S.C. 154(b) by 1580 days.

(21) Appl. No.: 11/172,260

(22) Filed: Jun. 30, 2005

(51) Int. Cl.
   *G06Q 10/00* (2006.01)
(52) U.S. Cl.
   USPC ........ 705/7.13; 705/7.11; 705/7.12; 705/7.16
(58) Field of Classification Search ............ 705/7.11–13
   See application file for complete search history.

(56) References Cited

U.S. PATENT DOCUMENTS

| | | | |
|---|---|---|---|
| 4,149,330 A | 4/1979 | Huff | |
| 4,852,001 A | 7/1989 | Tsushima et al. | |
| 4,896,269 A | 1/1990 | Tong | |
| 5,189,285 A * | 2/1993 | Young, Jr. .................... | 235/88 R |
| 5,272,638 A * | 12/1993 | Martin et al. .............. | 455/456.5 |
| 5,848,403 A * | 12/1998 | Gabriner et al. ................ | 706/13 |
| 5,992,344 A | 11/1999 | Bader | |
| 6,289,348 B1 * | 9/2001 | Richard et al. ......................... | 1/1 |
| 6,633,568 B1 * | 10/2003 | Han et al. ................... | 370/395.4 |
| 6,754,634 B1 * | 6/2004 | Ho ..................................... | 705/6 |
| 7,065,646 B1 * | 6/2006 | Hohensee et al. ............ | 713/168 |
| 7,127,411 B2 * | 10/2006 | Ho ..................................... | 705/8 |
| 2002/0059205 A1 * | 5/2002 | Graham et al. .................... | 707/3 |
| 2004/0193473 A1 * | 9/2004 | Robertson et al. ................ | 705/9 |
| 2006/0094488 A1 * | 5/2006 | Smith ............................... | 463/1 |
| 2009/0024368 A1 * | 1/2009 | Alfares ............................ | 703/2 |

OTHER PUBLICATIONS

P. Van Hentenryck, L. Michel, L. Perron, and J.C. Regin, "Constraint Programming in OPL" 1999, Springer Berlin / Heidelberg, Lecture Notes in Computer Science, Principles and Practrice of Declarative Programming, pp. 98-116.*

Paul M. Thompson, Harilaos N. Psaraftis, "Cyclic Transfer Algorithms for Multivehicle Routing and Scheduling Problems" Operations Research; Sep.-Oct. 1993, pp. 935-946.*

Paul M. Thompson, James B. Orlin, "The Theory of Cyclic Transfers", Operations Research Center, Massachusetts Institute of Technology, Aug. 1989, pp. 1-37.*

Marcus, David J. "Focus on Sport New Table-Tennis Rating System." The Statistician (2001) 50, Part 2, pp. 191-208, <http://74.125.93. 132/search?q=cache:sQ9qH6RUTJYJ:www.davidmarcus.com/Articles/NewTTRS.pdf+focus+on+the+sport+non-iterative+algorithm&cd=9&hl=en&ct=clnk&gl=us>.*

"Splendid City Team Sports Scheduler and Sports Scheduling Software System." Niagra Software 2003, <http://web.archive.org/web/20040615230241/http://www.splendidcity.net/>.*

Biajoli, Fabrico, Sousai, Marcone J.F., Chaves, Antonio A., Mine, Otavio M., Cabral, Lucidio A.F. and Pontes, Roberto C."Scheduling the Brazilian soccer Championship: Asimulated Annealing Approach." Department of computer Science, Federal University of Ouro Preto, Brazil, Oct. 2004.*

Van Hentenryck, P., Michel, L., Perron, L. and Regin, J.C. "Constraint Programming in OPL." Proc. PPDP'99, Int. Conf. on Principles and Practice of Declarative Programming, ed., G. Nadathur, LNCS 1703, pp. 97-116. Springer-Verlag, (1999).*

(Continued)

Primary Examiner — Andre Boyce
Assistant Examiner — Renae Feacher
(74) Attorney, Agent, or Firm — Law Office of Steven R. Olsen, PLLC; Steven R. Olsen

(57) ABSTRACT

A method and system for scheduling is disclosed. A computer generated generic matrix is provided allowing for creation of discrete pairs of discrete elements in combination, permutation, and the like. Applications of the method and system include, but are not limited to, sports scheduling, labor scheduling, manufacturing scheduling, laboratory experiments scheduling, sales performance scheduling.

12 Claims, 19 Drawing Sheets

OTHER PUBLICATIONS

Tomastik, Robert N. "Scheduling Flexible Manufacturing Systems for Apparel Production." IEEE Transactions on Robotics and Automation, vol. 12, No. 5, Oct. 1996, pp. 789-799.*

Empire Software."Team Scheduler Platinum 9." Jan. 2004, <http://www.empiresoftware.org/team-scheduler/features.htm>.*

Galactix."Round-Robin Schedule Tutorial," Feb. 2002, <http://www.galactix.com/tsss/docs/src/tutorial-rr.htm>.*

Biajoli, Fabrico, Sousai, Marcone J.F., Chaves, Antonio A., Mine, Otavio M., Cabral, Lucidio A.F. and Pontes, Roberto C."Scheduling the Brazilian soccer Championship: A simulated Annealing Approach." Department of computer Science, Federal University of Ouro Preto, Brazil, Oct. 2004.*

Empire Software."Team Scheduler Platinum 9 Professional Sports Scheduler & League Management System." ,http://web.archive.org/team-scheduler/features.html.*

Galactix Software."Round Robin Scheduler v4.0." ,http://web.archive.org/web/20040810204246/http://www.galactix.com/products/rrs40/index.html.*

Hamiez, Jean-Philippe Jean-Philippe.Hamiez@univ-angers.fr Hao, Jin-Kao, "A linear-time algorithm to solve the Sports League Scheduling Problem," Discrete Applied Mathematics; Sep. 2004, vol. 143 Issue 1-3, p. 252-265, 14p.*

Kostuk, Kent J. "A decision support system for a large multievent tournament," INFOR vol. 35, No. 3, Aug. 1997.*

Ferland, Jacques A. and Fleurent, Charles,"Computer Aided scheduling for a Sport League" INFOR vol. 9, No. 1, Feb. 1991.*

McAloon, Ken, et al., Sports League Scheduling, Proceedings of the 3rd llog International User's Meeting, 1997, Paris, France.

Hamiez, Jean-Philippe, et al., A Linear-Time Algorithm to Solve the Sports League Scheduling Problem (prob026 of CSPL/b), Discrete Applied Mathematics, 2004, pp. 252-265, v143.

Hamiez, Jean-Philippe, et al., Solving the Sports League Scheduling Problem with Tabu Search, Lecture Notes in Computer Science, 2001, pp. 24-36, vol. 2148.

* cited by examiner

Generic Matrix

| Element Pairings | Array 1 | | | Array 2 | | | Array 3 | | | Array 4 | | | Array 5 | | |
|---|---|---|---|---|---|---|---|---|---|---|---|---|---|---|---|
| 1 | A | @ | T | T | @ | B | C | @ | T | T | @ | D | E | @ | T |
| 2 | S | @ | B | A | @ | C | B | @ | D | C | @ | E | D | @ | F |
| 3 | Q | @ | D | R | @ | E | S | @ | F | A | @ | G | B | @ | H |
| 4 | O | @ | F | P | @ | G | Q | @ | H | R | @ | I | S | @ | J |
| 5 | M | @ | H | N | @ | I | O | @ | J | P | @ | K | Q | @ | L |
| 6 | K | @ | J | L | @ | K | M | @ | L | N | @ | M | O | @ | N |
| 7 | I | @ | L | J | @ | M | K | @ | N | L | @ | O | M | @ | P |
| 8 | G | @ | N | H | @ | O | I | @ | P | J | @ | Q | K | @ | R |
| 9 | E | @ | P | F | @ | Q | G | @ | R | H | @ | S | I | @ | A |
| 10 | C | @ | R | D | @ | S | E | @ | A | F | @ | B | G | @ | C |

Generic Matrix

| Element Pairings | Array 6 | | | Array 7 | | | Array 8 | | | Array 9 | | | Array 10 | | |
|---|---|---|---|---|---|---|---|---|---|---|---|---|---|---|---|
| 1 | T | @ | F | G | @ | T | T | @ | H | I | @ | T | T | @ | J |
| 2 | E | @ | G | F | @ | H | G | @ | I | H | @ | J | I | @ | K |
| 3 | C | @ | I | D | @ | J | E | @ | K | F | @ | L | G | @ | M |
| 4 | A | @ | K | B | @ | L | C | @ | M | D | @ | N | E | @ | O |
| 5 | R | @ | M | S | @ | N | A | @ | O | B | @ | P | C | @ | Q |
| 6 | P | @ | O | Q | @ | P | R | @ | Q | S | @ | R | A | @ | S |
| 7 | N | @ | Q | O | @ | R | P | @ | S | Q | @ | A | R | @ | B |
| 8 | L | @ | S | M | @ | A | N | @ | B | O | @ | C | P | @ | D |
| 9 | J | @ | B | K | @ | C | L | @ | D | M | @ | E | N | @ | F |
| 10 | H | @ | D | I | @ | E | J | @ | F | K | @ | G | L | @ | H |

Generic Matrix

| Element Pairings | Array 11 | | | Array 12 | | | Array 13 | | | Array 14 | | | Array 15 | | |
|---|---|---|---|---|---|---|---|---|---|---|---|---|---|---|---|
| 1 | K | @ | T | T | @ | L | M | @ | T | T | @ | N | O | @ | T |
| 2 | J | @ | L | K | @ | M | L | @ | N | M | @ | O | N | @ | P |
| 3 | H | @ | N | I | @ | O | J | @ | P | K | @ | Q | L | @ | R |
| 4 | F | @ | P | G | @ | Q | H | @ | R | I | @ | S | J | @ | A |
| 5 | D | @ | R | E | @ | S | F | @ | A | G | @ | B | H | @ | C |
| 6 | B | @ | A | C | @ | B | D | @ | C | E | @ | D | F | @ | E |
| 7 | S | @ | C | A | @ | D | B | @ | E | C | @ | F | D | @ | G |
| 8 | Q | @ | E | R | @ | F | S | @ | G | A | @ | H | B | @ | I |
| 9 | O | @ | G | P | @ | H | Q | @ | I | R | @ | J | S | @ | K |
| 10 | M | @ | I | N | @ | J | O | @ | K | P | @ | L | Q | @ | M |

Generic Matrix

| Element Pairings | Array 16 | | | Array 17 | | | Array 18 | | | Array 19 | | |
|---|---|---|---|---|---|---|---|---|---|---|---|---|
| 1 | T | @ | P | Q | @ | T | T | @ | R | S | @ | T |
| 2 | O | @ | Q | P | @ | R | Q | @ | S | R | @ | A |
| 3 | M | @ | S | N | @ | A | O | @ | B | P | @ | C |
| 4 | K | @ | B | L | @ | C | M | @ | D | N | @ | E |
| 5 | I | @ | D | J | @ | E | K | @ | F | L | @ | G |
| 6 | G | @ | F | H | @ | G | I | @ | H | J | @ | I |
| 7 | E | @ | H | F | @ | I | G | @ | J | H | @ | K |
| 8 | C | @ | J | D | @ | K | E | @ | L | F | @ | M |
| 9 | A | @ | L | B | @ | M | C | @ | N | D | @ | O |
| 10 | R | @ | N | S | @ | O | A | @ | P | B | @ | Q |

Generic Matrix 1000

| Element Pairs | Array 1 | Array 2 | Array 3 | Array 4 | Array 5 | Array 6 | Array 7 | Array 8 | Array 9 |
|---|---|---|---|---|---|---|---|---|---|
| 1 | 1 @ 10 | 10 @ 2 | 3 @ 10 | 10 @ 4 | 5 @ 10 | 10 @ 6 | 7 @ 10 | 10 @ 8 | 9 @ 10 |
| 2 | 9 @ 2 | 1 @ 3 | 2 @ 4 | 3 @ 5 | 4 @ 6 | 5 @ 7 | 6 @ 8 | 7 @ 9 | 8 @ 1 |
| 3 | 7 @ 4 | 8 @ 5 | 9 @ 6 | 1 @ 7 | 2 @ 8 | 3 @ 9 | 4 @ 1 | 5 @ 2 | 6 @ 3 |
| 4 | 5 @ 6 | 6 @ 7 | 7 @ 8 | 8 @ 9 | 9 @ 1 | 1 @ 2 | 2 @ 3 | 3 @ 4 | 4 @ 5 |
| 5 | 3 @ 8 | 4 @ 9 | 5 @ 1 | 6 @ 2 | 7 @ 3 | 8 @ 4 | 9 @ 5 | 1 @ 6 | 2 @ 7 |

Generic Matrix 1005

| Element Pairs | Array 10 | Array 11 | Array 12 | Array 13 | Array 14 | Array 15 | Array 16 | Array 17 | Array 18 |
|---|---|---|---|---|---|---|---|---|---|
| 1 | 10 @ 1 | 2 @ 10 | 10 @ 3 | 4 @ 10 | 10 @ 5 | 6 @ 10 | 10 @ 7 | 8 @ 10 | 10 @ 9 |
| 2 | 2 @ 9 | 3 @ 8 | 4 @ 2 | 5 @ 3 | 6 @ 4 | 7 @ 5 | 8 @ 6 | 9 @ 7 | 1 @ 8 |
| 3 | 4 @ 7 | 5 @ 6 | 6 @ 9 | 7 @ 1 | 8 @ 2 | 9 @ 3 | 1 @ 4 | 2 @ 5 | 3 @ 6 |
| 4 | 6 @ 5 | 7 @ 4 | 8 @ 7 | 9 @ 8 | 1 @ 9 | 2 @ 1 | 3 @ 2 | 4 @ 3 | 5 @ 4 |
| 5 | 8 @ 3 | 9 @ 4 | 1 @ 5 | 2 @ 6 | 3 @ 7 | 4 @ 8 | 5 @ 9 | 6 @ 1 | 7 @ 2 |

SYSTEM AND METHOD FOR SCHEDULING

FIELD OF THE INVENTION

The present invention relates to the field of scheduling. In particular, the invention relates to a computer method and system for generating schedules that employs a generic matrix algorithm to create an optimal configuration of discrete pairings of discrete elements.

BACKGROUND OF THE INVENTION

Currently, all of the processes or methods used to create application schedules fall into one of three categories. Each process provides some degree of scheduling, but each is limited to some degree by having an upper size restriction, a long processing time, minimum application features or a requirement of programming customization for each application.

Manual scheduling involving discrete pairing is typically limited to approximately 10 to 12 discrete elements. This is due to the inability of the human mind to simultaneously process all of the possible combinations of an average complex application. Typically the end product of manual scheduling is limited to the most basic schedule and lacks any degree of order except in its smallest form. Manual scheduling is ultimately dependent on the skills of the person manually producing the application.

An iteration algorithm can produce a larger application, but is typically limited as it requires more time and computer capacity as the number of elements and features increase in an application. The iteration processes generally requires each pairing opportunity to be compared with other pairings for evaluation for selection or rejection, therefore, requiring more time due to the number of program executions. This method becomes even more difficult to execute when needing special features as this adds calculation time. The schedule quality degrades rapidly as the size increases.

Scheduling done by an algorithm designed for a specific application is the most effective. An algorithm designed for a specific application is designed for a minimum number of program loops to accomplish the task and therefore decreases execution time. In cases where the application's specifications change, however, the algorithm must be modified accordingly. The result is increased design time, test time, downtime and the possibility of human error.

These and other problems exist. Previous attempts to solve these and other problems include the following.

U.S. Pat. No. 4,149,330, issued to Huff, discloses a digital instant schedule computer that computes and displays symmetric schedules for assigning participants to stations in an experiment or tournament.

U.S. Pat. No. 5,992,344, issued to Bader, discloses a disc sports tournament scheduler for an elimination tournament having receptors for entrants to first and subsequent rounds of event in fields for each round, with final round field in centre and others concentrically outwards.

U.S. Pat. No. 4,896,269, issued to Tong, discloses a job shop scheduling and production method which computes priority and flexibility indices and resolves the highest priority conflict by relaxing one or more steps in one or more jobs.

U.S. Pat. No. 4,852,001, issued to Tsushima discloses a job scheduling method for people or equipment having workload allocated to each time unit along a time axis in units of job and resource type.

None of these known methods solve the above-mentioned problems. Therefore, a need exists for an improved system and method of scheduling.

BRIEF SUMMARY OF THE INVENTION

A purpose of the invention, which will be described subsequently in greater detail, is to provide a new system and method for scheduling. In particular, the invention relates to a generic matrix algorithm that creates a template of discrete pairs of discrete elements based on input from a user. The template can subsequently be used to generate a user-defined specific application schedule. The term schedule as used herein means data organized in a special arrangement, such that it produces a guide, tool or data linked process control.

At the core of this process are a generic matrix algorithm and the generic matrix (a/k/a generic matrix template or template) it creates. The generic matrix is the basis for a multitude of applications relating to scheduling and comparative analysis.

This generic matrix algorithm creates a series of arrays with each array representing a change in sequence, time, stages, periods, procedure, states, steps, etc. While each array has an identical set of generic discrete elements, each array has its own unique pairing of the generic discrete elements.

The series of arrays, i.e., the generic matrix, becomes a specific matrix (a/k/a specific application schedule, or specific application matrix) in part by the conversion of each generic discrete element to a specific discrete element. A specific matrix may be a schedule, activity, arrangement, pattern, assortment, mixture, summary, etc. of specific discrete elements. Specific discrete elements may be, for instance, people, teams, locations, items, time, factors, conditions, distances, components. Generic labels are also replaced by specific identification labels in the specific matrix.

Embodiments of the invention have one or more unique features that set them apart from other similar processes, methods and procedures, especially when compared to the features of size, speed, utility, order, optimization, flexibility and/or repeatability.

Size: a schedule can be created for a virtually unlimited number of discrete elements, restricted only by computer memory and the ability to display the results.

Speed: the generic matrix algorithm is structured to generate a template of discrete pairs of discrete elements of virtually any size by having only the number of discrete elements as input. This structure creates the template at a faster speed than conventional methods.

Utility: embodiments of the invention can function within any programming environment that has basic programming functions, such as a Microsoft Excel spreadsheet, a basic language program, etc. Embodiments of the invention include an algorithm that is in effect a software engine to create a generic matrix template for use with a multitude of custom applications.

Order: the right-hand and left-hand assignments of each pairing of the discrete elements are significant for some common schedule applications. The right-hand or left-hand assignment of each discrete element is alternated from array to array with only a two consecutive right-hand or left-hand assignments. This alternation affords balance across the arrays and benefit to the application and which can be seen in the schedules presented herein.

Optimization: for each array, and across all arrays in a schedule, each discrete element has an associated non-conflict relationship with another discrete element. By non-conflict it is meant that the right-hand and left-hand assignments of these two discrete elements are always opposite of each other. In short, they can never occur at the same place at the same time over an entire schedule. This can be seen in the schedules presented herein.

Flexibility: a single application may be split into multiple separate applications with simultaneous processing. These split applications retain all the features such as balance and the non-conflict relationship across the split applications. Combination pairing or permutation pairing can be used depending on the application requirement. This can be seen in the schedules presented herein.

Repeatability: each schedule generated is an ordered schedule and embodies the identical specifications of every other schedule generated regardless of size; therefore, each schedule of a specific size becomes the standard or the schedule template for any or all applications of the same size. This can be seen in the schedules presented herein.

The invention has many uses, for example:
a. Scheduling:
Sports
  Any sport or game competition between teams, people, etc.
Labor
  Airline crews, e.g. scheduling pilot, co-pilot and stewardess crews as well as the standby/on call crew pairs
  Hospital, Factory, Sales, etc.
  Manufacturing scheduling of items, e.g. tops and skirts for women
b. Comparative Analysis of pairings, arrays, etc.
Sales performance by pairs or by array groups
Molecular/Biological/DNA/Chemical pairing and bonding studies through the generation of all possible pairs and bonds for study.
Medical diagnosis of symptoms and test results (discrete elements) such that each array has results in a different diagnosis.
Predictive analysis based on observations of conditions, values, etc. (discrete elements) such that each array has results in a different prediction.
A factor may be used as a specific discrete element for weighting or to alter the template.

One objective of the invention is to provide a generic algorithm that can produce a template for creating schedules involving discrete pairs of discrete elements.

Another objective of the invention is to provide a system and method of scheduling that has improved features compared to existing scheduling solutions.

Another objective of the invention is to provide a system and method of scheduling that utilizes software and computers.

BRIEF DESCRIPTION OF THE SEVERAL VIEWS OF THE DRAWINGS

Other advantages and features of the invention are described with reference to exemplary embodiments, which are intended to explain and not to limit the invention, and are illustrated in the drawings in which:

FIG. 4 is a representation of a BASIC language program output showing a generic matrix generated for 10 discrete elements, according to an embodiment of the invention;

FIG. 5 is a representation of a generic matrix and a left-right assignment graphic for 10 discrete elements, according to an embodiment of the invention;

FIG. 7 is a left-right assignment graphic for an generic matrix with 20 discrete elements, according to an embodiment of the invention;

FIG. 8 is a representation of a generic matrix consistent with the left-right assignment graphic in FIG. 7, according to an embodiment of the invention;

FIG. 9 is a sports-related specific application schedule, according to an embodiment of the invention;

FIG. 10A is a representation of a generic matrix for 10 discrete elements together with a reverse combination matrix, according to an embodiment of the invention;

FIG. 10B is a labor-related specific application schedule based on the generic matrix in FIG. 10A, according to an embodiment of the invention;

FIG. 11 is a manufacturing-related specific application schedule, according to an embodiment of the invention;

FIG. 12A is a specific application schedule illustrating the scheduling of five non-conflict pairs, according to an embodiment of the invention;

FIG. 12B is a split specific application schedule that is an alternative to the specific application schedule in FIG. 12A, according to an embodiment of the invention;

DETAILED DESCRIPTION OF THE INVENTION

Before disclosing embodiments of the invention in detail, it is to be understood that the invention is not limited in its application to the details of the particular arrangement shown since the invention is capable of other embodiments. Also, the terminology used herein is for the purpose of description and not of limitation.

The generic matrix algorithm may be or include a software engine that is configured to create a generic matrix. Some applications may require multiple schedules; in this instance, a user could create multiple generic matrices. For each generic matrix, a user enters the total number of discrete elements to be scheduled. Each generic matrix includes a series of arrays. Each array includes the same set of generic discrete elements (e.g., the discrete elements could be integers 1, 2, . . . n) but has a unique set of discrete element pairings. The resulting generic matrix could be a one-pass combination schedule, a one-pass permutation schedule, or multiple passes of either by appending two or more generic matrices together. Each generic matrix becomes a specific application matrix by converting each generic discrete element to a specific discrete element and each generic label to an application-specific label. For instance generic discrete element identifiers (1, 2, . . . n) could be replaced by team names (specific discrete elements). In addition, generic labels associated with the title, arrays, x-axis, y-axis, right hand and left hand assignments can be replaced with labels that are relevant to the specific application schedule. The generic matrix has now been converted to a specific application schedule. Based on the user-supplied formatting criteria, the specific application schedule can be formatted and output to one or more of a computer display output, a computer printer, a data link and/or a storage media.

Figure 1:
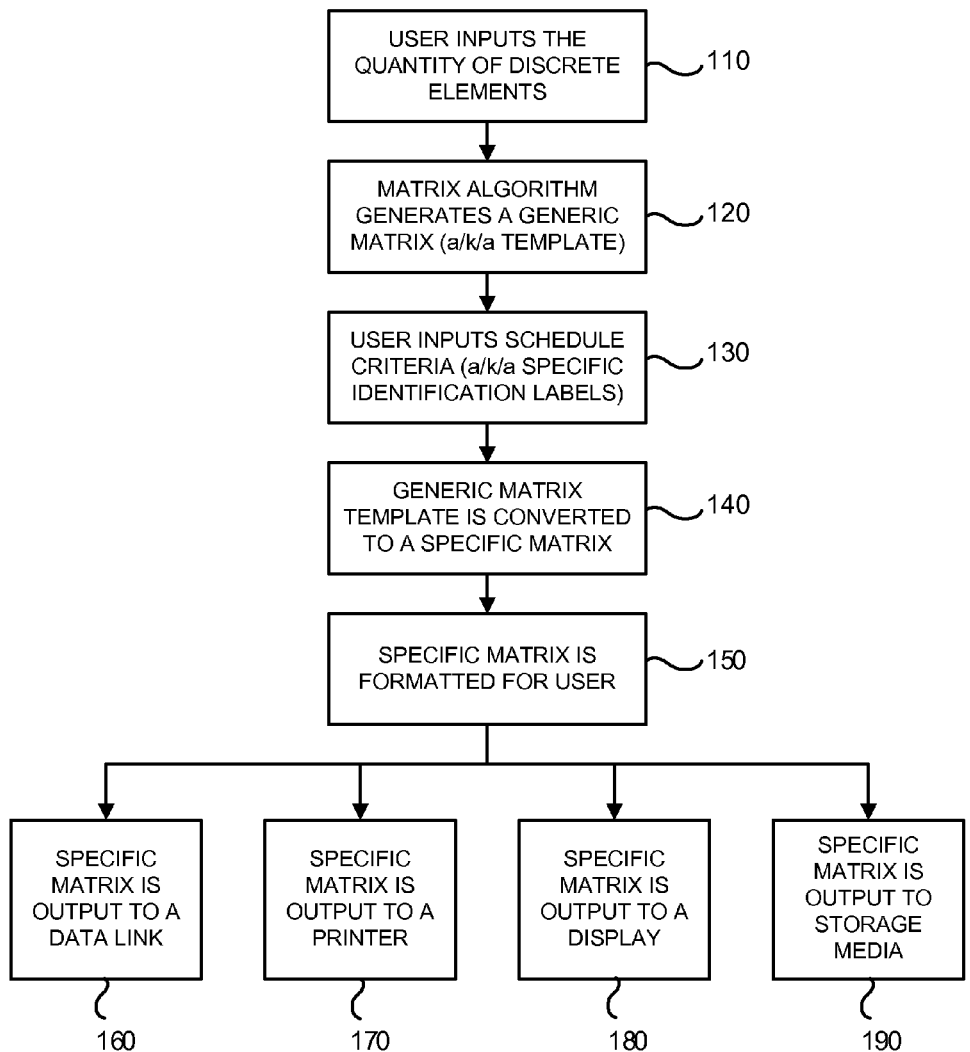
FIG. 1 is a flow diagram of a process for generating a schedule, according to an embodiment of the invention.

FIG. 1 is a flow diagram of a process for generating a schedule, according to an embodiment of the invention. The illustrated process highlights the relationship between the generic matrix algorithm, the generic matrix template it creates, and the specific application schedule that is based on the generic matrix template. The process begins in step 110 when the user inputs a discrete element quantity. The discrete elements quantity is the number of items to be scheduled. For instance, a discrete element quantity of 10 could represent 10 teams that are to be scheduled in pairs. In step 120, the generic matrix algorithm uses the discrete element quantity to generate a generic matrix (a/k/a a generic matrix template or a template). In step 130, the user inputs schedule criteria (such as specific discrete element names and application-specific labels). In step 140, the schedule criteria are used to convert the generic matrix into a specific matrix (a/k/a a specific application matrix or an application schedule). In step 150, the specific matrix is formatted for output. The specific matrix may then be output to a computer display device in step 180, a printer device in step 170, a data link in step 160 or a data storage media in step 190.

Figure 2:
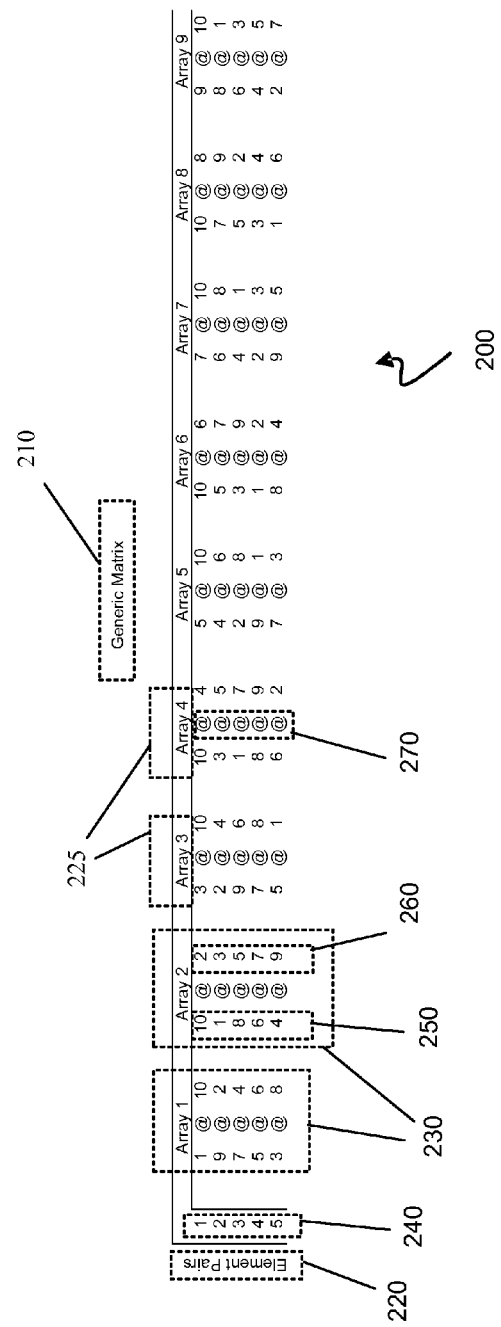
FIG. 2 is a representation of a generic matrix generated for 10 discrete elements, according to an embodiment of the invention.

FIG. 2 shows a generic-matrix 200 for ten discrete elements (represented by integers 1-10). Generic matrix 200 includes a series of nine generic matrix arrays 230 (Array 1 through Array 9). Each generic matrix array includes a left column 250 and a right column 260. The discrete elements (integers 1-10) are paired by the generic algorithm such that each generic matrix array 230 contains a discrete pair of discrete elements (in the left column 250 and the right column 260) for each particular row 240. Also shown in the representation of generic matrix 200 is generic a title 210, a generic y-axis title 220, generic x-axis titles 225 and a generic relationship indicator 270. When the generic relationship indicator 270 is converted to a specific relationship indicator, the meaning associated with the specific relationship indicator becomes specific to the schedule. For example, the character @ may be translated to at, plays at, with, plus, and, combined with, against, plays, or the like. For example, A @ B could translate to A plays against B.

Figure 3:
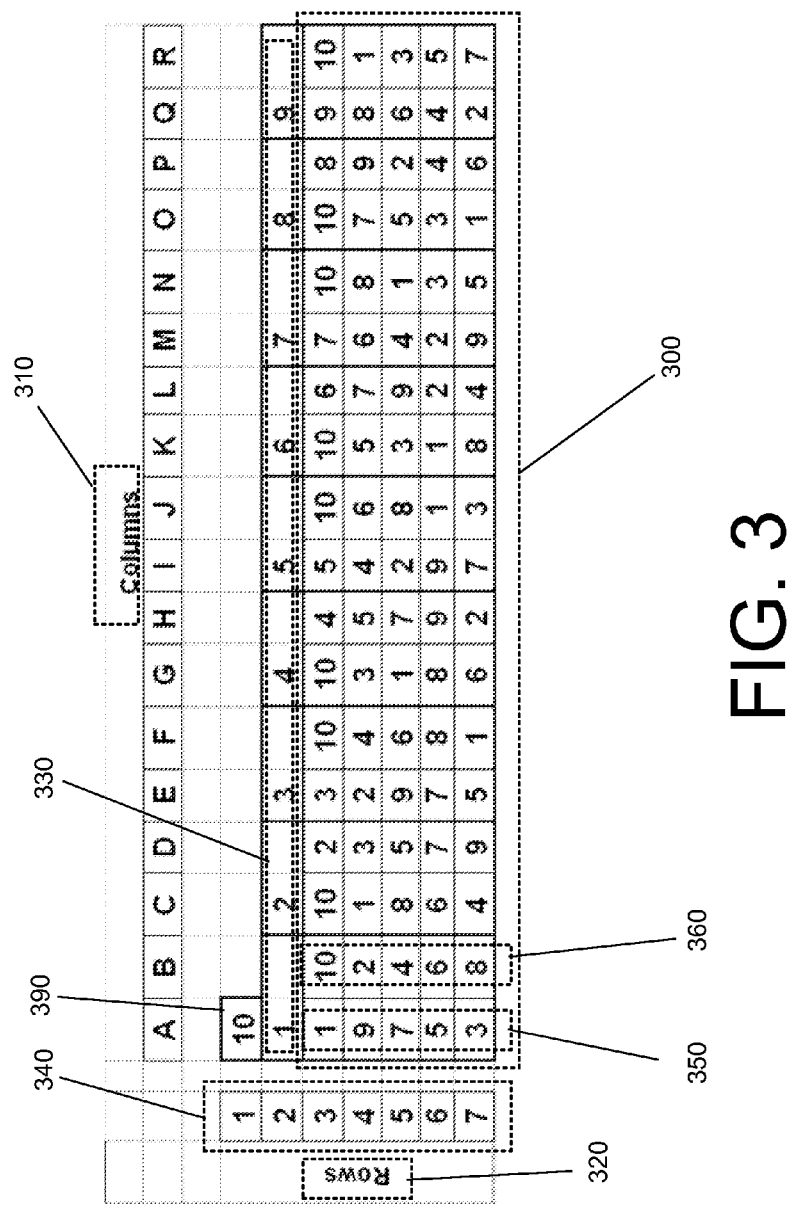
FIG. 3 is a representation of a Microsoft EXCEL spread sheet showing a generic matrix generated for 10 discrete elements, according to an embodiment of the invention.

FIG. 3 shows an example of a Microsoft EXCEL spread sheet containing a representation of a 10-element generic matrix 300. In the illustrated embodiment, the generic matrix 300 includes 9 arrays. FIG. 3 also shows a generic x-axis title 310, y-axis title 320, array identifiers 330, and row identifiers 340. A left column 350 and right column 360 of Array 1 are labeled to illustrate that each of the 9 arrays includes two columns. Each row of an array includes a pair of discrete elements. And each pair of discrete elements includes an integer from the left column and an integer from the right column. For instance, in array 1, a first pair of discrete elements includes integers 1 and 10, a second pair includes integers 9 and 2, a third pair includes integers 7 and 4, a fourth pair includes integers 5 and 6 and a fifth pair includes integers 3 and 8. FIG. 3 also shows discrete element quantity 390, which is entered by the user into cell A1. An example of the EXCEL program code used to generate generic matrix 300 is as follows:

Columns A and B—Rows 3 and Rows 4:
  A3=1
    'The cell value of A3 equals the start value of the generic matrix, 1.
  B3=A1
    'The cell value of 83 equals the end value of the generic matrix, A1.
  A4=B3−1
    'The cell value of A4 equals the end value of the generic matrix minus 1.
  B4=A3+1
    'The cell value of B4 equals the start value of the generic matrix plus 1.
Columns A and B—Rows 5 and greater:
  A5=IF(A4−2>1,A4−2,"")
    'if the value of A4−2 is greater than 1 then A5 equals A4−2, otherwise A5 equals null.
  B5=IF(B4+2<$A$1,B4+2,"")
    'if the value of B4+2 is less than $A$1 then B4 equals B4+2, otherwise 85 equals null.
  Copy and paste A5 and B5 as a group into A6 and B6 as a group and continue copying into the next row of columns A and B until the number of element pairs in Column A and B equal $A$½.
Row 3—Columns "C" and greater:
  C3=IF(C2<$A$1,$A$1,"")
    'if the array identifier in cell C2 is less than $A$1 then the cell value of C3=$A$1, otherwise C3 is null.
  D3=IF(C2<$A$1,C2,"")
    'if the array identifier in cell C2 is less than $A$1 then the cell value of D3=C2, otherwise D3 is null.
  E3=IF(E2<$A$1,E2,"")
    'if the array identifier in cell E2 is less than $A$1 then the cell value of E3=E2, otherwise E3 is null.
  F3=IF(E2<$A$1,C3,"")
    'if the array identifier in cell E2 is less than $A$1 then the cell value of F3=A$1$, otherwise F3 is null.
  Copy and paste the formulas in cells C3, D3, E3 and F3 as a group into cells G3, H3, I3 and J3 as a group, and continue copying in groups of four cells in Row 3 until the number of pairs in Row 3 equal $A$1−1.
Row 4 and greater—Columns "C" and greater:
  C4=IF(A4+1<$A$1,A4+1,IF(A4+1=$A$1,1,""))
    'if the value of A4+1 is less than $A$1 then C4 equals A4+1, else if A4+1 is equal to $A$1 then C4 equals 1, otherwise C4 is null.
  Copy the formula in cell C4 and paste into the entire area bounded from C4 to R7.

Figure 4:
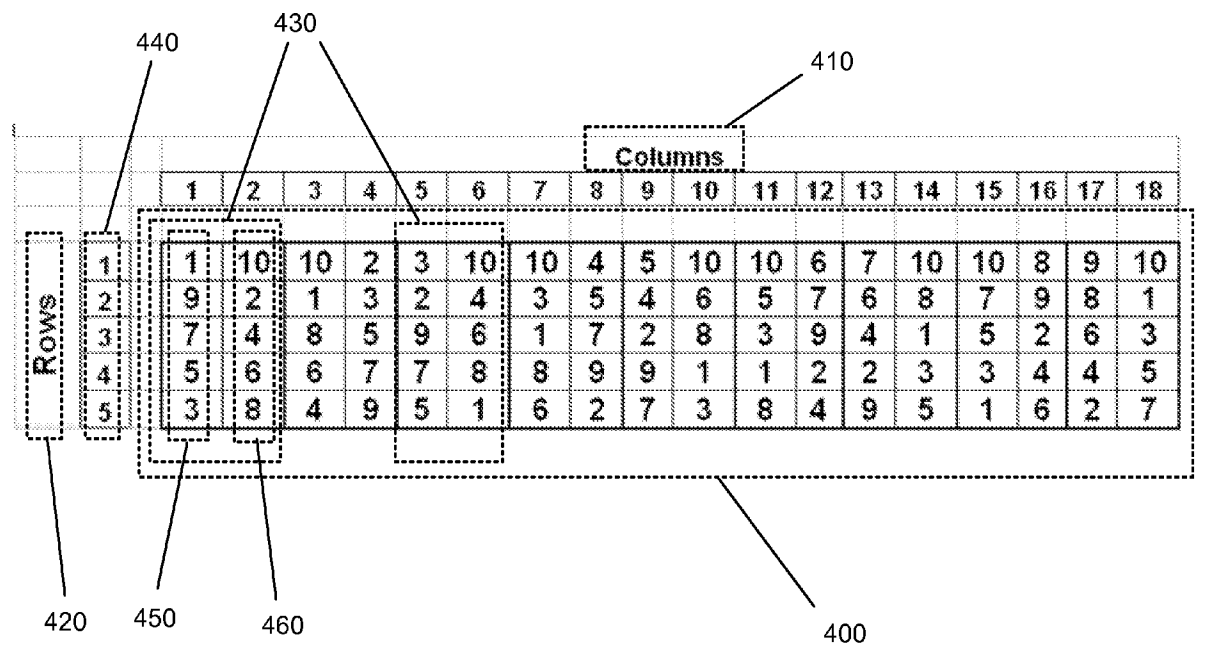

FIG. 4 is an example of a generic matrix 400 that is created using a BASIC language program. FIG. 4 includes generic x-axis title 410, y-axis title 420, arrays 430, and row numbers 440. FIG. 4 also shows left column 450 and right column 460 of a first one of the arrays 430. Because each of the arrays 430 includes two columns, a total of 9 arrays are illustrated in FIG. 4. Since each of the arrays 430 includes five rows, a total of five element pairs are included in each array. For instance, where each cell is identified by Matrix(column, row), the first element pair includes a "1" in Matrix(1, 1) and a "10" in Matrix(2, 1). An example of BASIC program code used to generate generic matrix 400 is as follows:
Start Procedure:
  Input the quantity of discrete elements to be scheduled
  MatrixSize=input value
  If MatrixSize is Even then MatrixSize=MatrixSize
  If MatrixSize is Odd then MatrixSize=MatrixSize+1
  Columns=2*(MatrixSize−1)
Rows=MatrixSize/2

Figure 5:
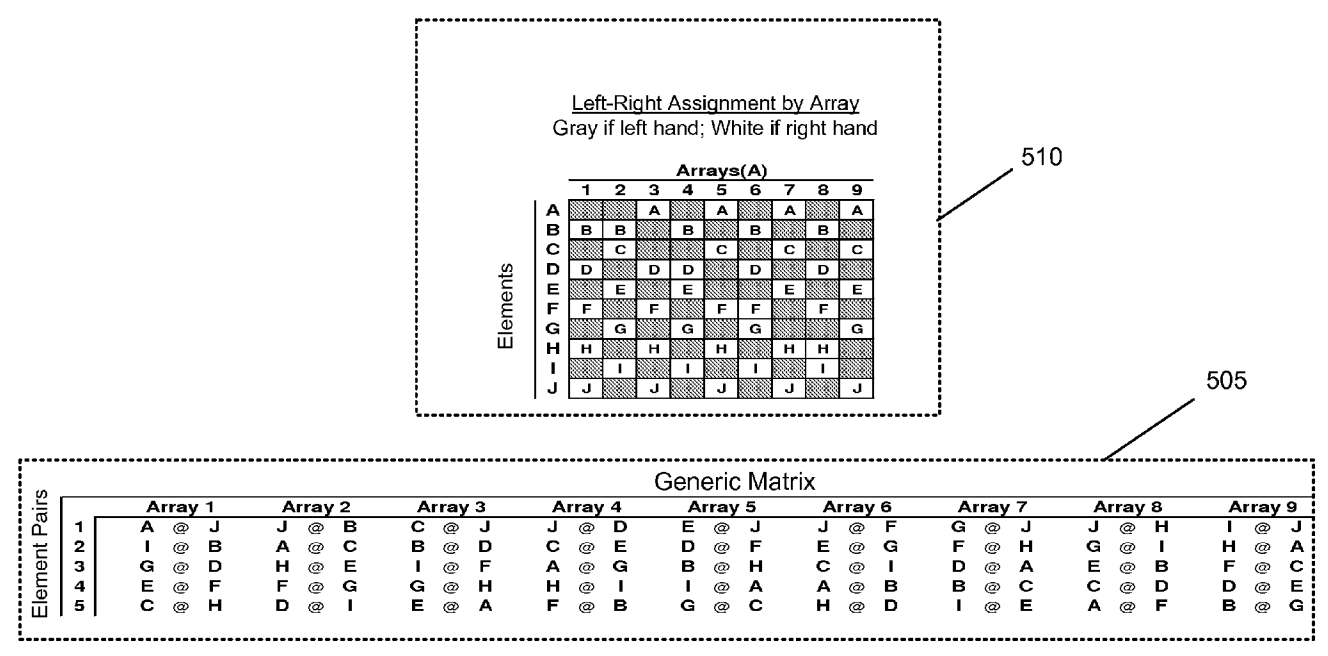

Sets Columns 1 & 2 from Row 1 through Row 2:
    Matrix(1, 1)=1
    Matrix(2, 1)=MatrixSize
    Matrix(1, 2)=Matrix(2, 1)−1
    Matrix(2, 2)=Matrix(1, 1)+1
Sets Columns 1 & 2 from Row 3 through the last Row:
    For R=3 to Rows
    Matrix(1, R)=Matrix(1, R−1)−2
    Matrix(2, R)=Matrix(2, R−1)+2
    Next R
Sets Row 1 from Column 3 through the last column:
    For C=3 to Columns−3 Step 4
    Matrix(C,1)=MatrixSize 'sets value MatrixSize in Row 1
    Matrix(C+3, 1)=MatrixSize 'sets value MatrixSize in Row 1
    Next C
    I=2
    For C=4 to Columns Step 4
    Matrix(C,1)=I
    Matrix(C+1, 1)=I+1
    I=I+2
    Next C
Sets Row 2 through the last Row from Column 3 through the last Column:
    For R=2 to Rows
    For C=3 to Columns−1 Step 2
    If Matrix(C−2, R)=Columns/2 then Matrix(C, R)=1
    Else Matrix(C, R)=Matrix(C−2, R)+1
    Endif
    If Matrix(C−1, R)=Columns/2 then Matrix(C+1, R)=1
    Else Matrix(C+1, R)=Matrix(C−1, R)+1
    Endif
    Next C
    Next R
    End FIG. 5 is a representation of a generic matrix 505 and a corresponding left-right assignment graphic 510 for 10 discrete elements, according to an embodiment of the invention. As shown in FIG. 5, each of the discrete elements (A, B, . . . J) is combined with another one of the discrete elements (A, B, . . . J) in each of the sequence of Arrays (Array 1, Array 2, . . . Array 9) such that each scheduled pair in the generic matrix 505 is unique.

Figure 6:
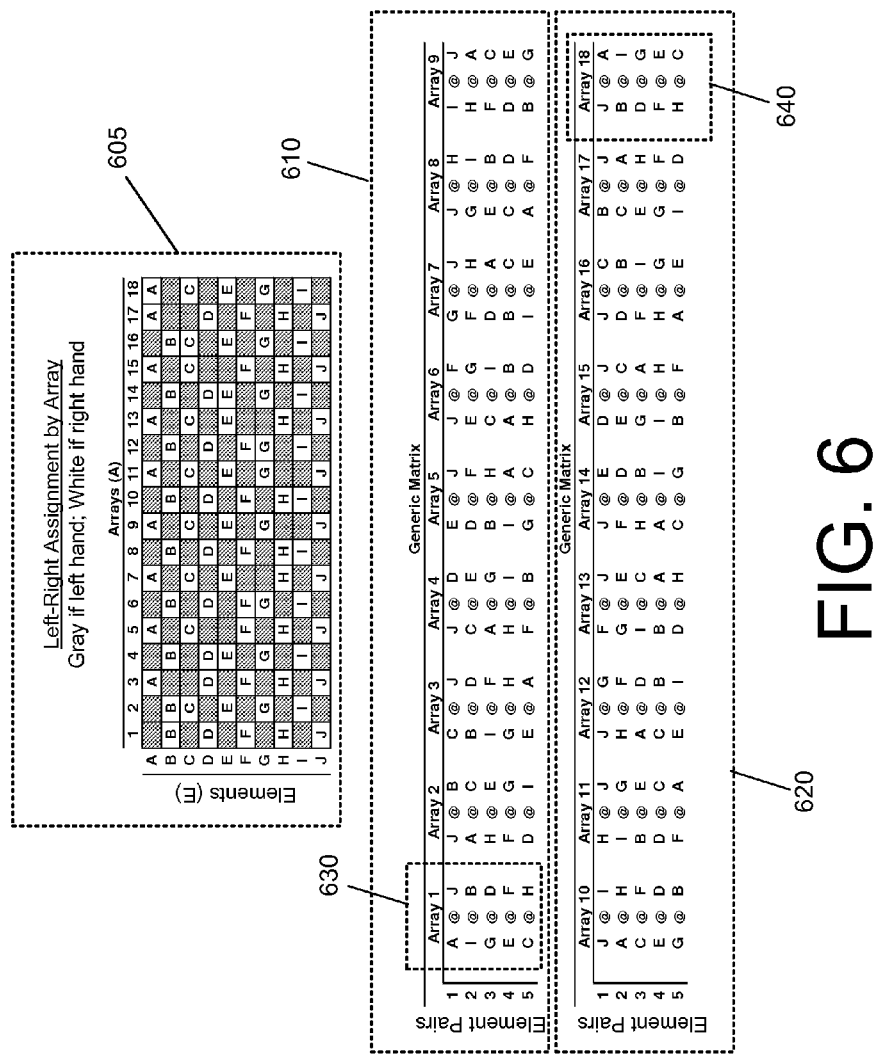
FIG. 6 is a representation of a combination matrix, a reverse combination matrix, and a left-right assignment graphic, according to an embodiment of the invention.
Figure 7:
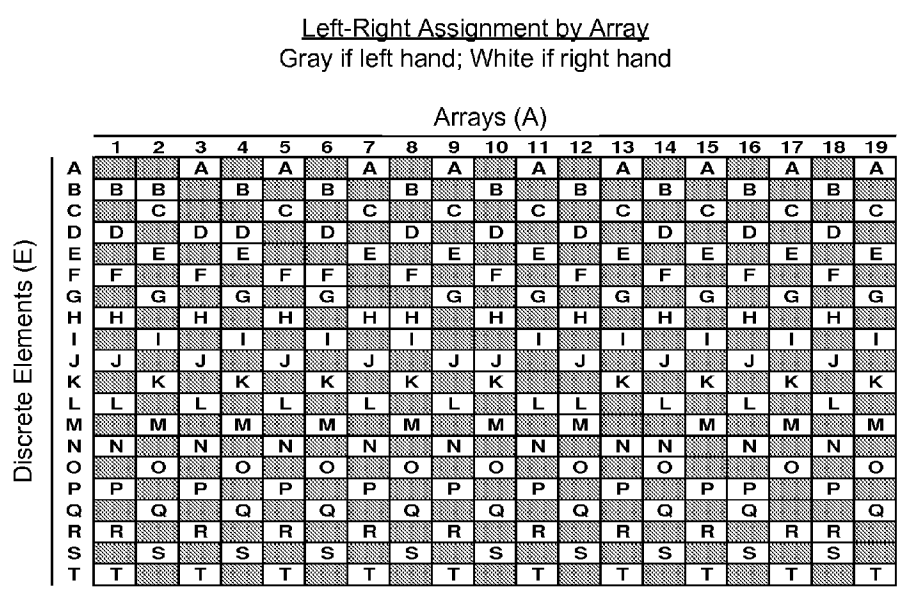

In one respect, FIG. 5 illustrates that the generic matrix 505 can be expressed using alphabetic characters rather than integers, even though the underlying pattern is consistent with the integer-based organization described above with reference to FIGS. 2-4. FIGS. 6-8 likewise express generic matrix variants using alphabetic characters.

In another respect, the corresponding left-right assignment graphic 510 in FIG. 5 highlights the fact that each discrete element is generally alternated between left and right columns in the sequence of Arrays such that no discrete element is scheduled in the left column for more than two consecutive Arrays or in the right column for more than two consecutive Arrays. This feature is referred to herein as alternation or balance. One benefit of balance can be seen by considering a sports-scheduling specific application using the generic matrix 505 in FIG. 5. In such an application, each discrete element could be a team, each array could be a weekly competition, the left-hand assignment could be used to denote an away game, and the right-hand assignment could be used to denote a home game. In such an application, it can be seen that each team is scheduled for a total of either 4 or 5 home games. Accordingly, advantages associated with playing home games are minimized as between each of the competing teams. Likewise, disadvantages in playing away games are minimized as between each of the competing teams.

In yet another respect, the left-right assignment graphic 510 in FIG. 5 highlights the fact that each two consecutive discrete elements are scheduled such that the two consecutive discrete elements are not both scheduled in a left-hand or right-hand position in any array. For instance, it can be said that discrete elements A and B are non-conflicting, discrete elements C and D are non-conflicting, discrete elements E and F are non-conflicting, etc. For any such non-conflicting pair of discrete elements, the left-hand and right-hand assignments are opposite for the two discrete elements that form the non-conflicting pair. The potential benefit of non-conflicting pairs can again be appreciated with reference to a sports scheduling application. Again, each discrete element could be a team, each array could be a weekly competition, the left-hand assignment could be used to denote an away game, and the right-hand assignment could be used to denote a home game. In sports scheduling, a first team and a second team may share a single facility such as a basketball court, tennis court, or other facility. In a scheduling application, the first team and the second team can be scheduled as non-conflicting pairs so that the shared facility is not scheduled for more than one home game in any given week.

FIG. 6 is a representation of a combination matrix 610, a reverse combination matrix 620, and a left-right assignment graphic 605, according to an embodiment of the invention. FIG. 6 illustrates that a combination matrix 610 can be used to form a permutation matrix (combination matrix 610 together with reverse combination matrix 620), while still maintaining non-conflict and balance features. Combination matrix 610 is identical to the 9-array combination matrix in FIG. 5. Reverse combination matrix 620 can be appended to combination matrix 610 to form an 18-array permutation matrix. As can be seen by the arrangement of the pairs of discrete elements, the eighteenth array 640 is a mirror of first array 630. For instance A @ J in the first array 630 is mirrored by J @ A in the eighteenth array 640. This mirrored pattern is repeated by corresponding discrete pairs of discrete elements in the eighteenth array 640. The mirrored pattern also exists with respect to other corresponding arrays in the combination matrix 610 and the reverse combination matrix 620.

FIG. 7 is a left-right assignment graphic for a generic matrix with 20 discrete elements, according to an embodiment of the invention. FIG. 8 is a representation of a generic matrix consistent with the left-right assignment graphic in FIG. 7, according to an embodiment of the invention. In the embodiment illustrated in FIGS. 7 and 8, ten (10) discrete pairs of discrete elements are scheduled in each of nineteen (19) arrays. Together, FIGS. 7 and 8 illustrate that the balance and non-conflict features described above are maintained as the number of scheduled discrete elements is increased.

Figure 9:
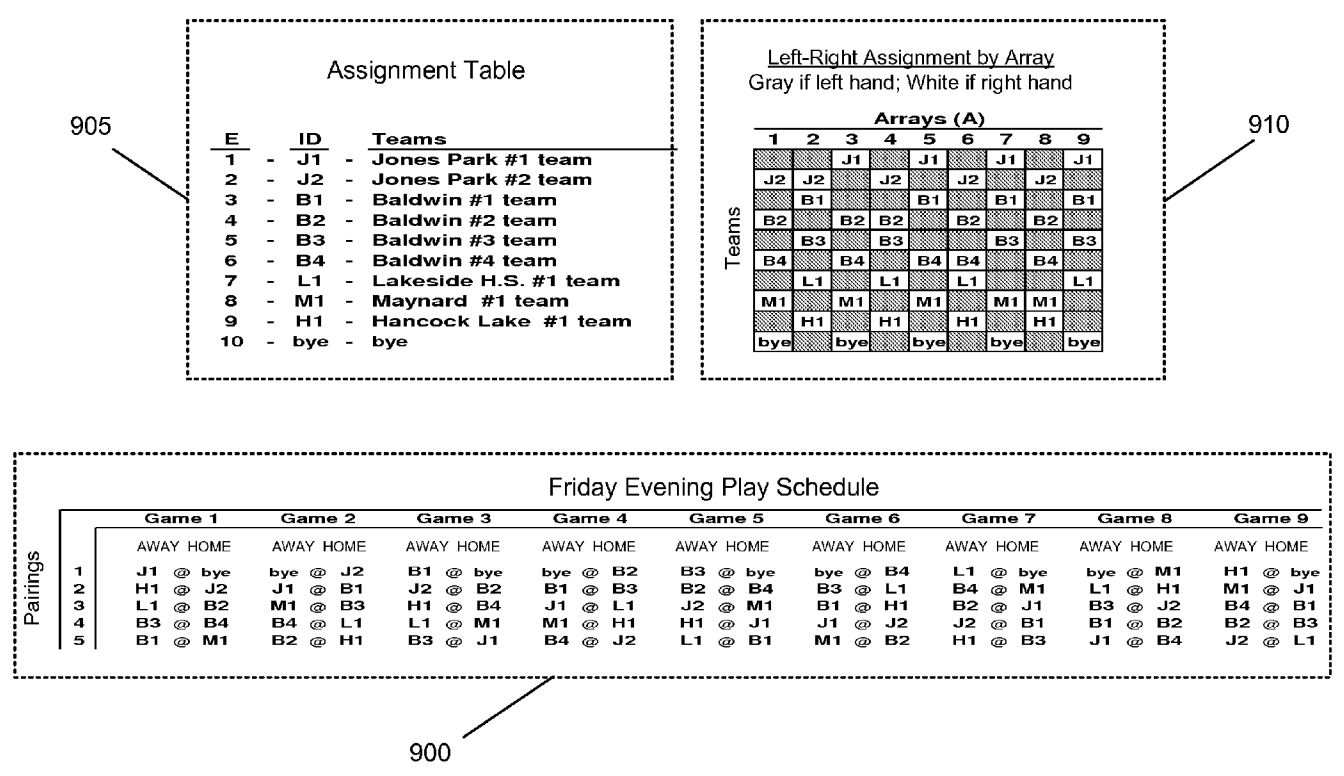

FIG. 9 is a sports-related specific application schedule, according to an embodiment of the invention. In particular, FIG. 9 illustrates a specific application schedule 900, an assignment table 905 and a left-right assignment graphic 910. In this example, a small town has a basketball league consisting of 10 teams. The league's season lasts 9 weeks so that every team has the opportunity to play every other team once over the course of the season. Basketball court availability is at a minimum. The Baldwin teams have only two courts, the Jones Park teams share a single court, and the remaining teams have only one court each. They must all play at the same time on Friday night of each week and cannot stagger start times.

Fair scheduling always attempts to balance the number of home and away games, alternates home and away games and minimizes same court same time assignments. Since there are 10 discrete elements to be scheduled, the generic matrix 200, 300, 400, or 505 may be used.

A feature of the generic matrix 200, 300, or 400 is that the discrete elements 1 and 2, 3 and 4, 5 and 6, etc. are non-conflicting pairs and therefore right-hand and left-hand assignments of these pairs are always opposite each other. In the case of generic matrix 505, the non-conflict pairs include discrete elements A and B, C and D, E and F, etc. The process of converting the generic matrix to the specific application schedule takes advantage of this feature by assigning same facility teams to non-conflict pairs. Such assignments are depicted in the assignment table 905 and left-right assignment graphic 910.

Note that the Jones Park teams (i.e., Jones Park #1 and Jones Park #2) are never at home court at the same time. In addition, the four Baldwin teams use a maximum of only two courts at the same time. A second feature of the generic matrix is the fairest alternation of home and away games. A third feature of the generic matrix is the fairest number of home and away play. All of these features and advantages can be seen with reference to the left-right assignment matrix 910.

Another part of converting the generic matrix 200, 300, 400, or 505 to the specific application matrix includes substituting a team identification tag (ID) (a/k/a a specific discrete element) for each generic discrete element. The conversion process also replaces generic identification labels such as title, arrays, x-axis, y-axis, right hand and left hand labels to specific identification labels that are tailored to the specific application. FIG. 9 illustrates the resulting specific application matrix 900.

Other team scheduling embodiments are also possible. As an example, with the algorithm of the present invention, 1,000 teams could be used to produce 499,500 combinations or 999,000 permutations.

Figure 10B:
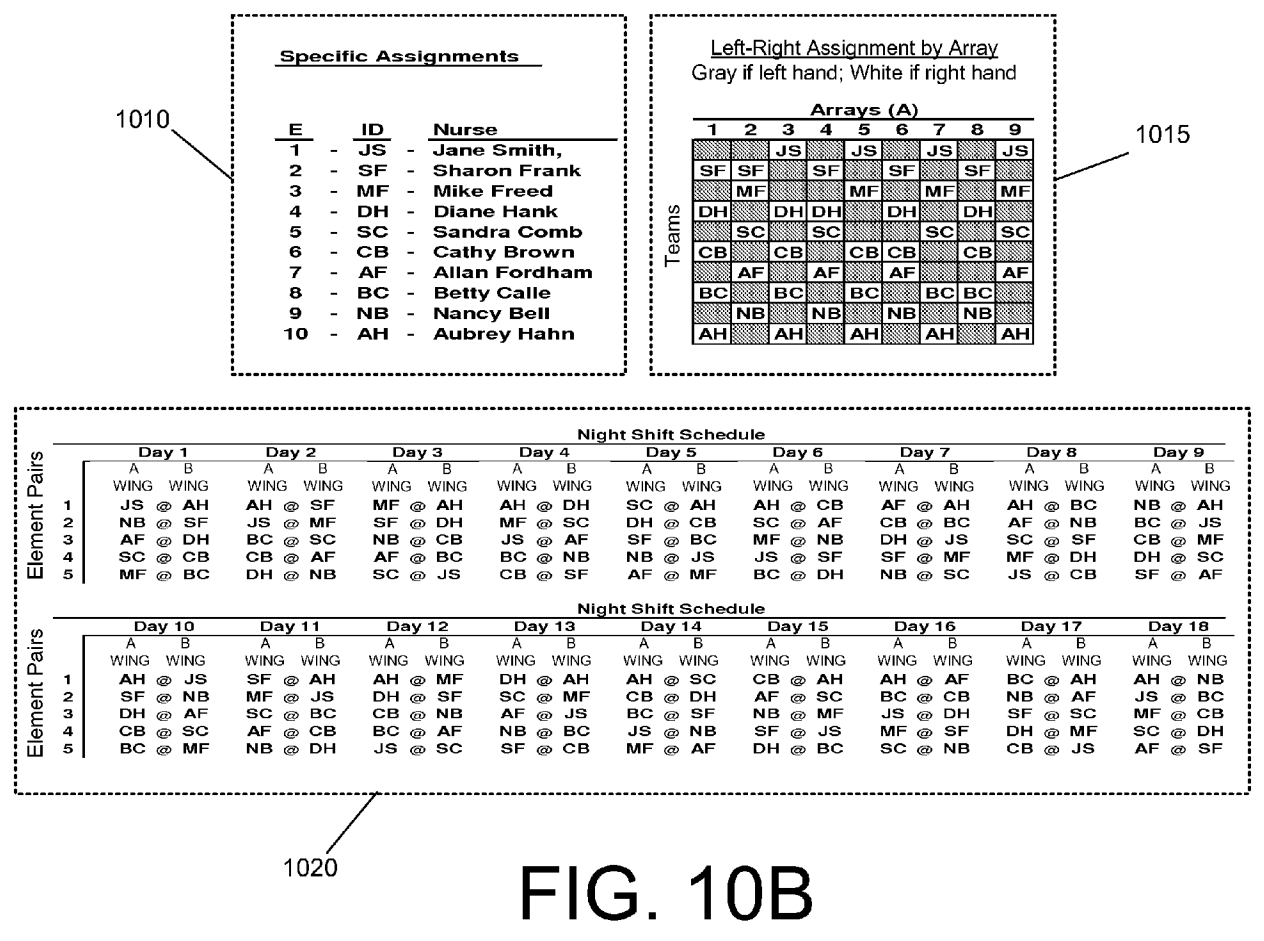

FIG. 10A is a representation of a generic matrix for 10 discrete elements together with a reverse combination matrix, according to an embodiment of the invention. FIG. 10B is a labor-related specific application schedule based on the generic matrix in FIG. 10A, according to an embodiment of the invention.

In the example illustrated in FIG. 10B, a hospital operates 24 hours per day with three shifts at 8 hours per shift. It employs 10 nurses per shift for each shift. It has an "A" wing for regular care and a "B" wing for intensive care. Nurses are hired and placed into a specific time shift based on their preferences. The hospital has established a policy of balance and fairness: all nurses are required to split their shifts equally between "A" wing and "B" wing duty, and to alternate their "A" wing and "B" wing duty from day to day as best as possible. The nurses are scheduled in pairs.

The generic matrices in FIG. 10A are the basis for the specific application schedule in FIG. 10B. The number of required elements (nurses) to be scheduled is 10. The generic matrix 1000 is a template of all possible combination pairings distributed over a series of arrays. In this example, a reversed generic matrix 1005 is appended to the generic matrix 1000 to provide an 18-array schedule of discrete element pairings.

Fair scheduling always attempts to balance the number of different assignments to alternate assignments and to minimize assignment conflicts. Features of the generic matrix are the fairest alternation of assignments and the generic matrix is the fairest number of different assignments. All of these features and advantages can be seen with reference to the specific assignment table 1010 and the left-right assignment graphic 1015.

The specific schedule application process converts the generic matrix 1000 and reverse generic matrix 1005 into a specific application matrix 1020 by substituting a nurse identification tag (ID) (a/k/a a specific discrete element) for each generic discrete element. In addition, generic identification labels such as the "Generic Matrix" title and the generic array labels are replaced with application-specific identification labels to produce the specific application schedule 1020.

The same scheduling process can be used for the day shift and the evening shift. This scheduling process could also be used to generate a list of standbys, e.g. by generating another schedule that would provide for 10 nurses on call. In another embodiment, the left-hand and right-hand assignment could be used to distinguish between desk duty and floor duty. A specific application schedule for nurses could be communicated through a data link. It should be kept in mind that with this algorithm, 1,000 nurses could be scheduled to produce 499,500 nurse combinations or 999,000 permutations.

Figure 11:
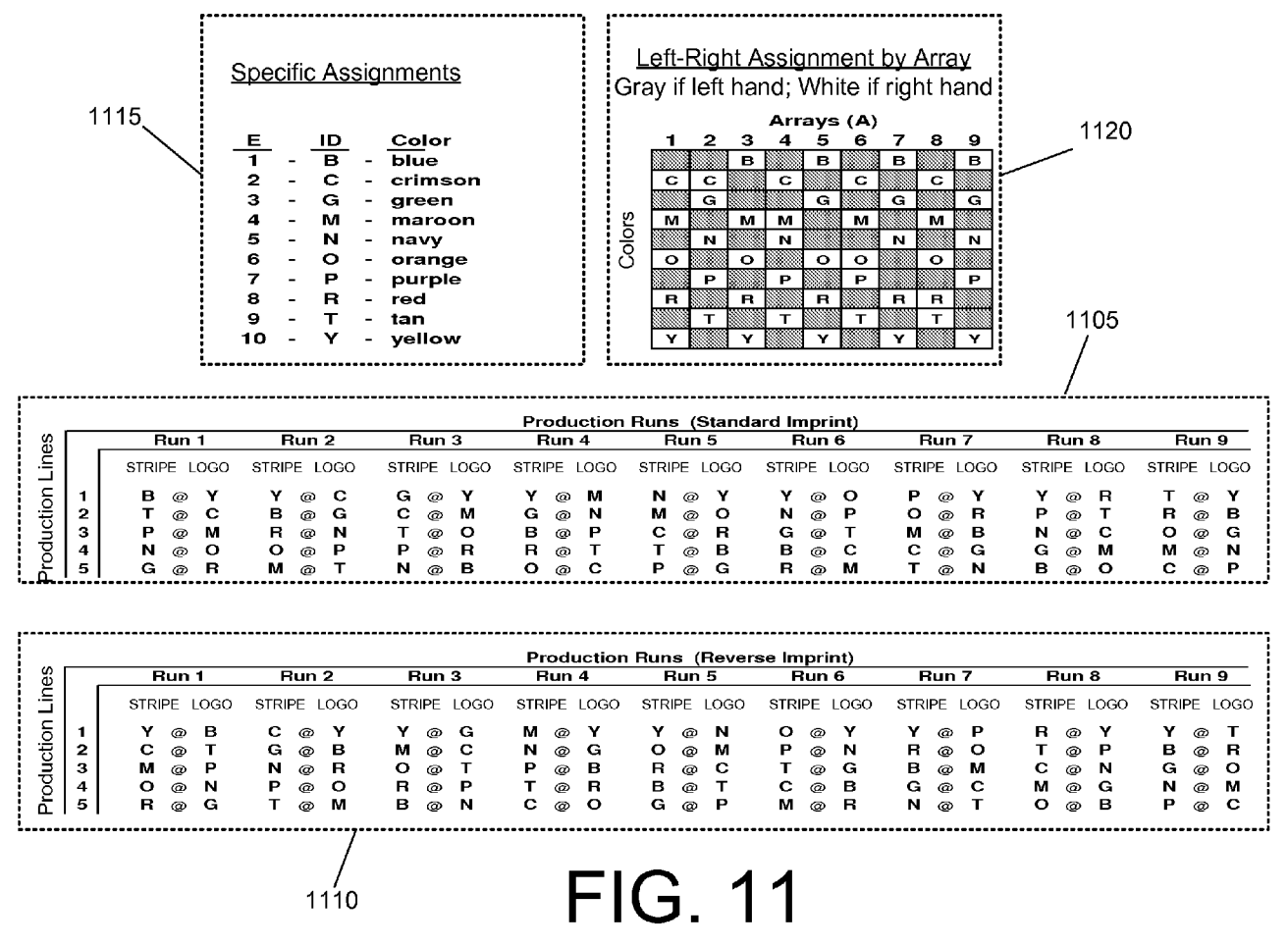

FIG. 11 is a manufacturing-related specific application schedule, according to an embodiment of the invention. In this example, a company sells T-shirts that have a stripe and logo imprinted on them. The stripe and the logo are of different colors, representing a school's color combinations. The shirts are manufactured and shipped to a distributor in 100-piece batches for each color combination. The manufacturer uses 10 colors to produce the shirts and has 5 production lines that can operate simultaneously. The number of required discrete elements (colors) is entered into the program creating a generic matrix of the required size. The 10-element generic matrix 1000 is representative of combination pairings distributed over a series of 9 arrays.

After the manufacturer sets up for this first run he decides that the schools might want the choice of either school color used for the stripe or logo. The present production scenario creates 45 different color combinations. If desired, the user could create a reversed generic matrix 1005 by reversing the left-hand and right-hand assignments in the generic matrix 1000. Together, the generic matrix 1000 and the reverse combination matrix 1005 can provide a basis for scheduling 90 color permutations of the 10 original colors.

The specific application schedule process converts the generic matrix 1000 and reverse combination matrix 1005 into a specific application matrix 1105 and 1110 by substituting a color identification tag (ID) for each generic discrete element ID. In addition, generic labels are replaced with application-specific identification labels. For instance, "runs" are substituted for generic array names and "stripe" and "logo" labels can be used for the left-hand and right-hand positions in each array. The result is the specific application schedules 1105 and 1110.

In this application the shirt has a stripe imprinted as indicated by the left-hand color assignment and a logo imprinted according to the right-hand color assignment. On production line #1 and in production run #1 (represented in row 1, run 1, of application schedule 1105), one hundred shirts could be produced with a blue stripe and a yellow logo. After all the remaining production lines and production runs are completed, 100 pieces of each color combination possible could be produced.

By contrast, row 1, run 1 of application schedule 1110 schedules production of shirts with a yellow stripe and a blue logo. Such an optimized schedule could lower production cost. If one was to schedule production runs sequentially as 1, 3, 5, etc. it can be seen that 4 of the 5 print inks are repeated on the same right hand or left hand assignment which could save considerable cost after a production run and during color changeover setup. The opportunity would depend on the line and production configuration. This schedule is an ordered schedule and can be shifted as desired, which provides flexibility. This schedule could be communicated through a data link. It should be kept in mind that with this algorithm, 1,000 colors could be used to produce 499,500 color combinations or 999,000 permutations.

Figure 12A:
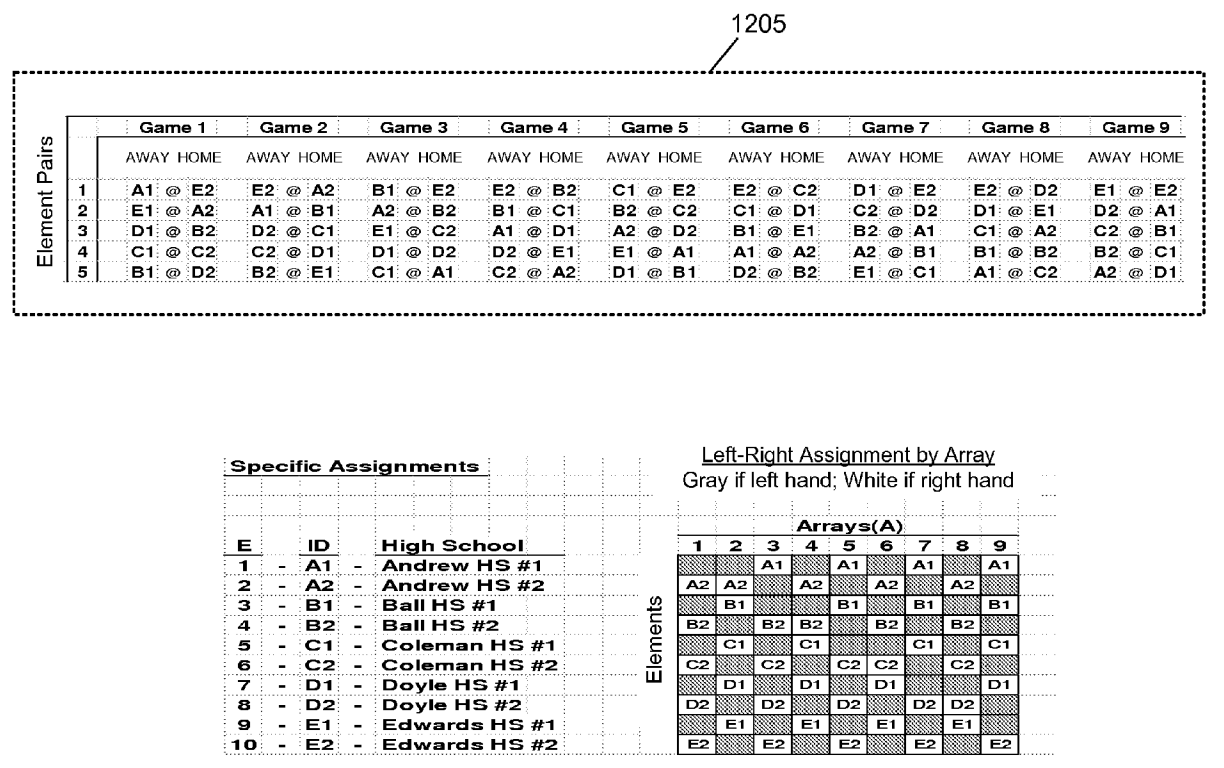
Figure 12B:
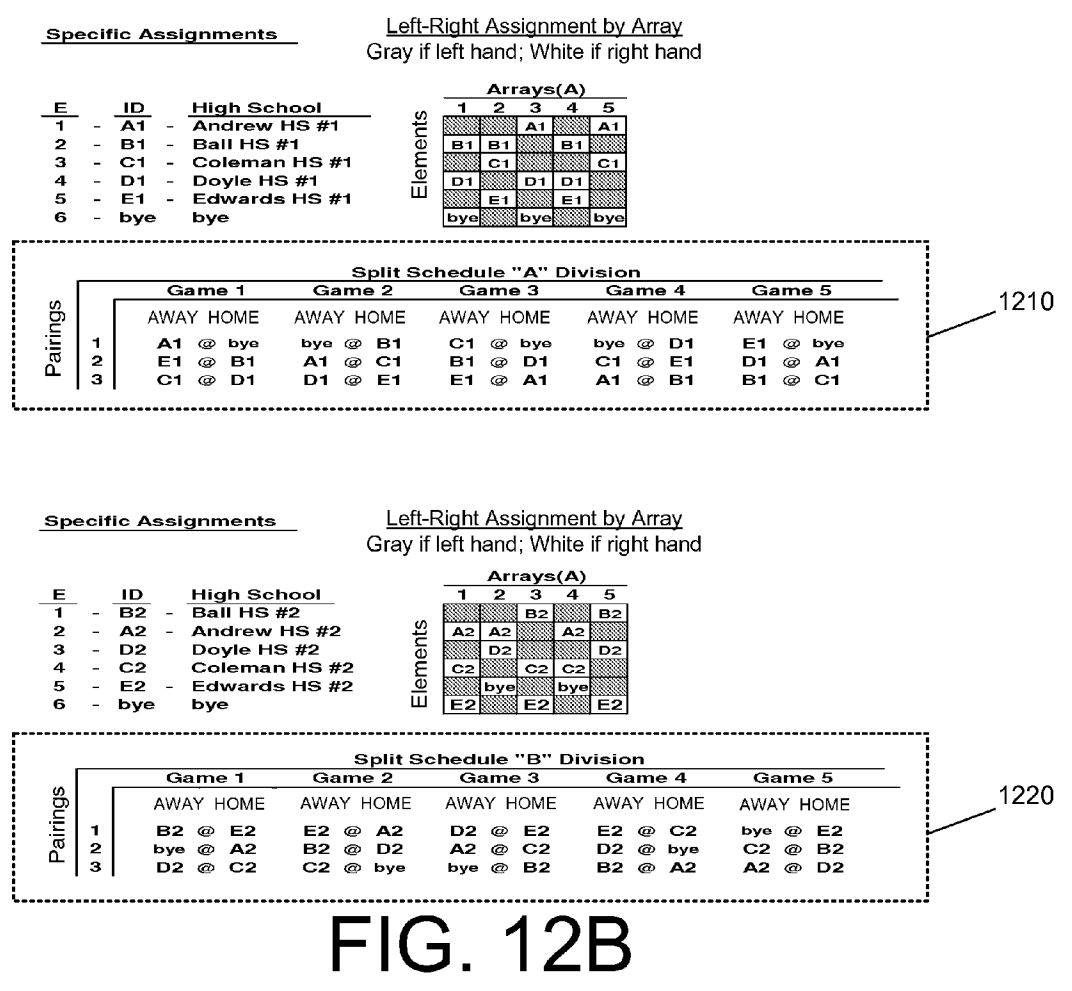

FIG. 12A is a specific application schedule illustrating the scheduling of five non-conflict pairs, according to an embodiment of the invention. FIG. 12B is a split specific application schedule that is an alternative to the specific application schedule in FIG. 12A, according to an embodiment of the invention. In this example, a school system initially schedules an intramural league for 10 teams to be completed in 9 weeks according to schedule 1205 in FIG. 12A. Later, the school system decides to complete the games in 6 weeks maximum due to other demands on the student body. They decide that they will split the original schedule 1205 into two divisions of five teams each. The winner of each division will play off in the 6th week to decide the league championship.

To create two equal divisions, a generic matrix was created for each new division and the specific discrete elements (i.e., school names) were substituted for the generic discrete elements (1, 2, . . . 6). The result is the two division schedules 1210 and 1220 in FIG. 12B. The ability to split a single schedule into multiple smaller schedules is a simple process. Note the following characteristics exist in the original schedule 1205 and in each of the split schedules 1210 and 1220:

1) The same alternating characteristics of home and away play.
2) The same number of home or away games, plus or minus one.
3) The pairings of non-conflict pairs.
  a. A1 and A2 are non-conflicting in the original schedule because they are assigned to lines 1 and 2 of the same schedule.
  b. A1 and A2 are non-conflicting across the split schedules because they are assigned to lines 1 of one schedule and line 2 of the other schedule. Every generic matrix has the same specifications regardless of size therefore non-conflict relationship applies across separate schedules.

Figure 13:
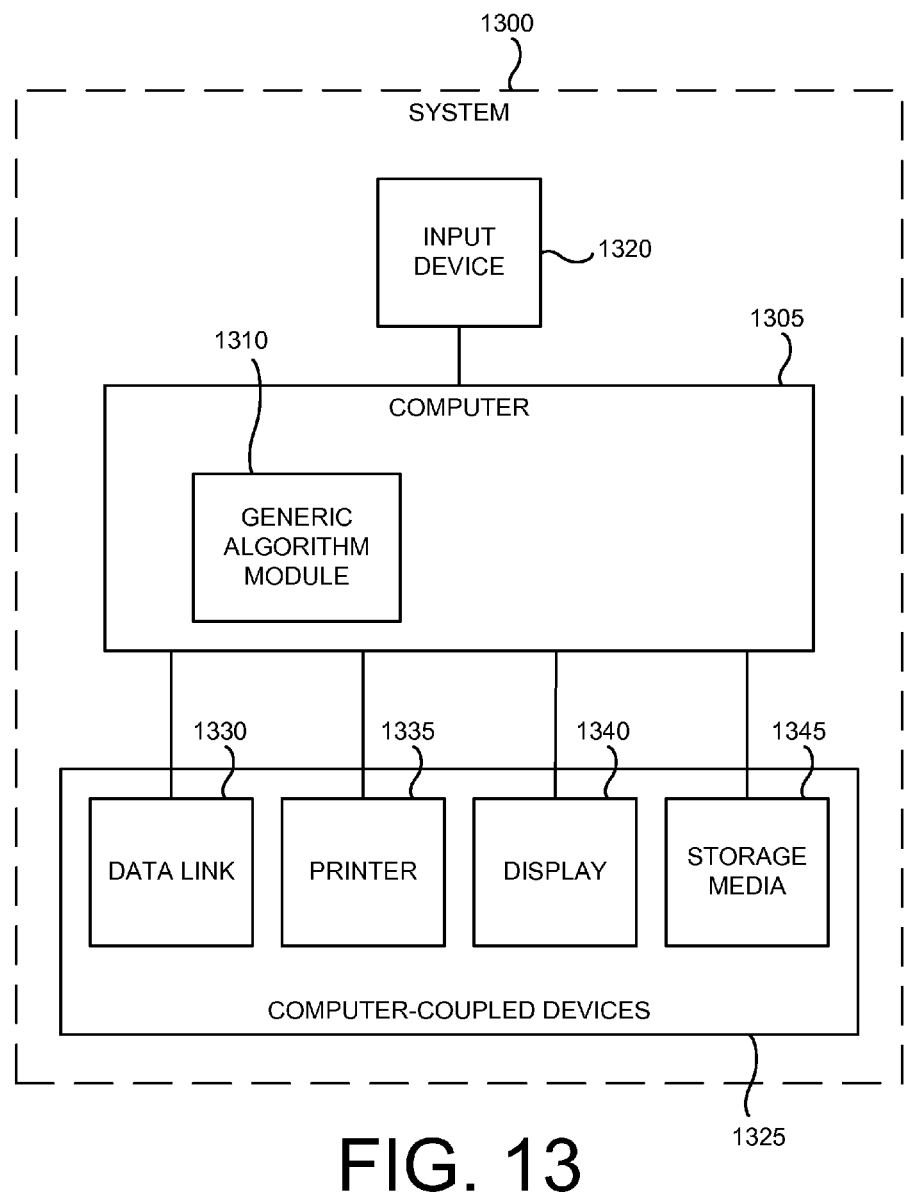
FIG. 13 is functional block diagram of a scheduling system, according to an embodiment of the invention.

FIG. 13 is a functional block diagram of a scheduling system, according to an embodiment of the invention. As shown in FIG. 13, the scheduling system 1300 may include a computer 1305 that is coupled to an input device 1320 and computer-coupled devices 1325. The computer 1305 may include a generic algorithm module 1310. The generic algorithm module 1310 may be configured to output a generic matrix based on, for instance, a number of discrete elements that have been input by a user into the input device 1320.

Variations to the configuration illustrated in FIG. 13 are possible.

Figure 14:
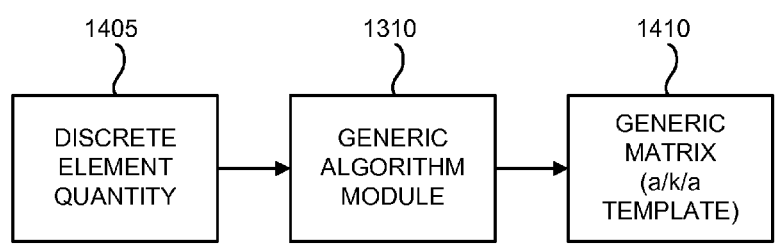
FIG. 14 is a functional block diagram of a generic application module, according to an embodiment of the invention.

FIG. 14 is an input/output diagram of a generic algorithm module 1310, according to an embodiment of the invention. As illustrated therein, the generic algorithm module 1310 receives a discrete element quantity 1405 and outputs a generic matrix (or template) 1410. The discrete element quantity 1405 may be or include, for example, a discrete integer value. The generic algorithm module 1310 may be or include hardware, software, or a combination of hardware and software. The generic matrix 1410 may be a two-dimensional array as described above. The generic algorithm module 1310 may be, for instance, configured to implement the algorithms discussed above with reference to FIGS. 3 and 4, and/or as discussed below with reference to FIGS. 16A-16C.

Figure 15A:
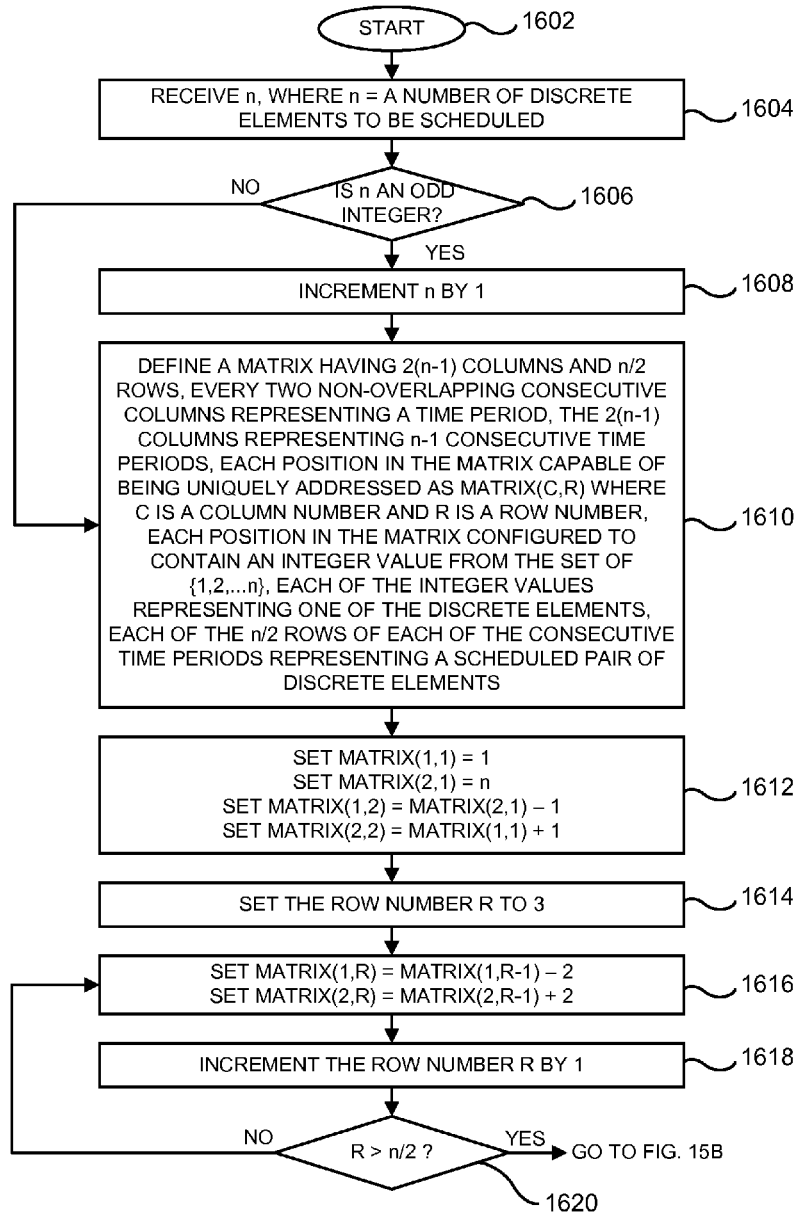
FIGS. 15A-15C are a flow diagram of a process for creating a generic matrix, according to an embodiment of the invention.
Figure 15B:
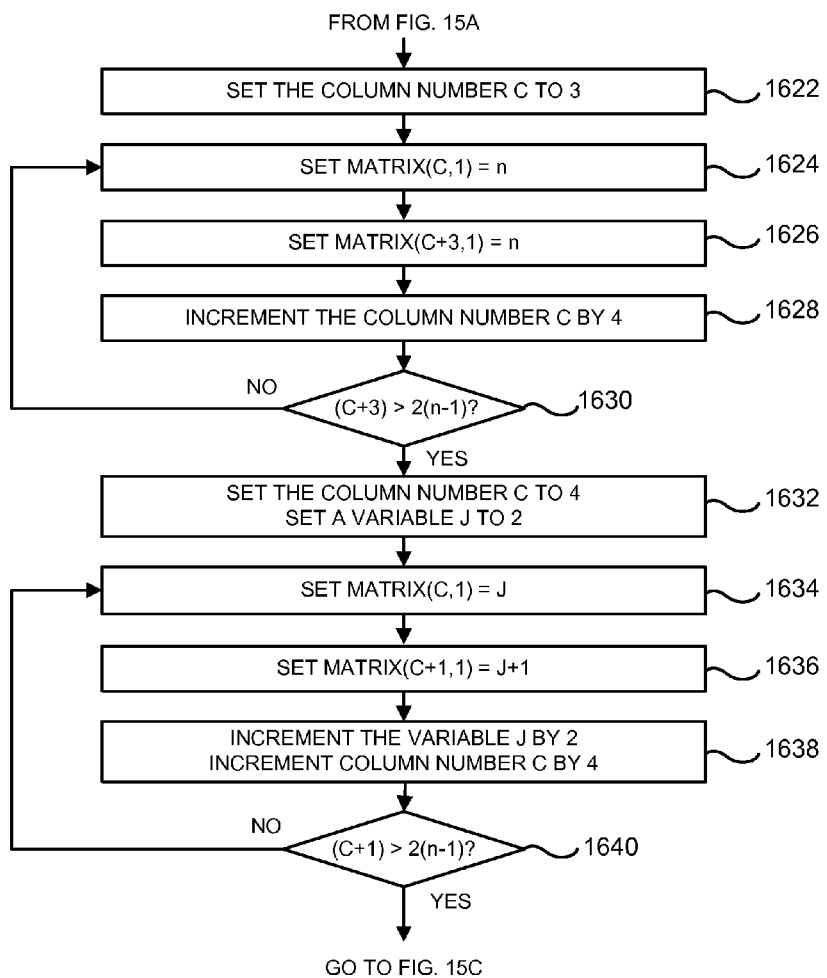
Figure 15C:
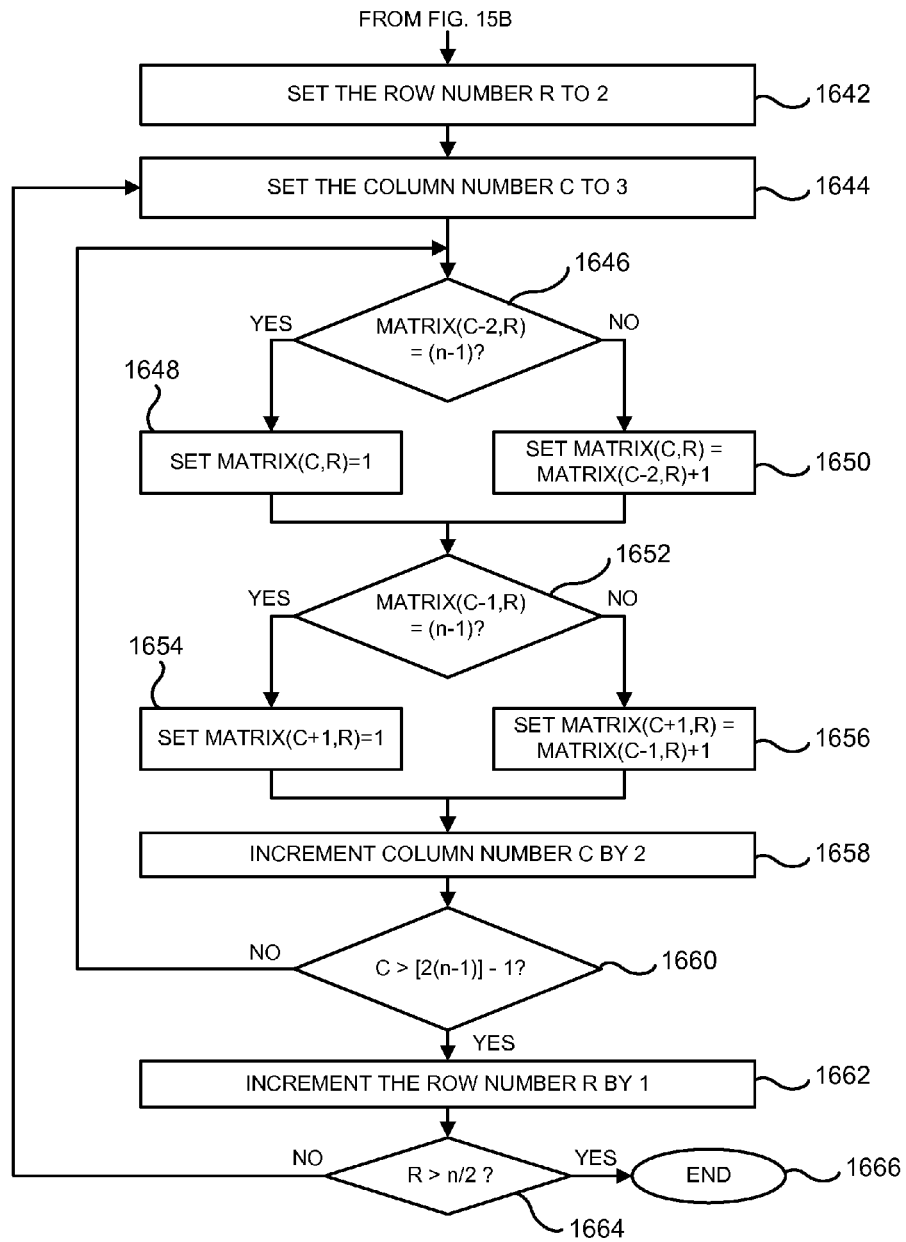

FIGS. 15A through 15C are a flow diagram of a scheduling process, according to an embodiment of the invention. The scheduling process in FIGS. 15A through 15C may be, for example, a process implemented by the generic algorithm module 1310. With reference to FIG. 15A, the process begins in step 1602 and then receives n, where n is equal to a number of discrete elements to be scheduled in step 1604. Next, in conditional step 1606, the process determines whether n is an odd integer. Where the result of conditional step 1606 is affirmative, the process increments n by 1 in step 1608. Then, in step 1610, the process defines a matrix having 2(n−1) columns and n/2 rows, every two non-overlapping consecutive columns representing a time period, the 2(n−1) columns representing n−1 consecutive time periods, each position in the matrix capable of being uniquely addressed as MATRIX (C, R), where C is a column number and R is a row number, each position in the matrix configured to contain an integer value from the set of {1, 2 . . . n}, each of the integer values representing one of the discrete elements, each of the n/2 rows of each of the consecutive time periods representing a scheduled pair of discrete elements. Where the result of conditional step 1606 is negative, the process advances directly to step 1610.

Subsequent to step 1610, the process advances to step 1612 to set MATRIX(1, 1)=1. Also in step 1612, the process sets MATRIX(2, 1)=n. In addition, in step 1612, the process sets MATRIX(1, 2)=MATRIX(2, 1)−1 and also sets MATRIX(2, 2)=MATRIX (1, 1)+1. Accordingly, in step 1612, the process sets discrete element values for the first two rows of the first two columns in the generic matrix.

Next, in step 1614, the process sets the row number R to 3. Then, in step 1616, the process sets MATRIX(1, R)=MATRIX(1, R−1)−2 and also sets MATRIX(2, R)=MATRIX(2, R−1)+2. In step 1618, the process increments the row number R by 1. Then, in conditional step 1620, the process determines whether R>n/2. Where the condition in step 1620 is not satisfied, the process returns to step 1616. Otherwise, the process advances to step 1622. Accordingly, in steps 1614 through 1620, the process sets discrete element values for the third and subsequent rows of the first two columns of the generic matrix.

With reference to FIG. 15B, the process sets the column number C to 3 in step 1622. Next, in step 1624, the process sets MATRIX(C,1)=n. Then, in step 1626, the process sets MATRIX(C+3, 1)=n. In step 1628, the process increments the column number C by 4. Subsequent to step 1628, the process determines in conditional step 1630 whether (C+3)>2(n−1). Where the condition in step 1630 is not satisfied, the process returns to step 1624. However, where the condition in step 1630 is met, the process advances to step 1632 to set the column number C to 4 and to also set a variable J to 2. Then, in step 1634, the process sets MATRIX(C,1)=J. Next, in step 1636, the process sets MATRIX(C+1, 1)=J+1. Then, the process increments the variable J by 2 and also increments the column number C by 4 in step 1638. Subsequent to step 1638, the process determines in conditional step 1640 whether (C+1)>2(n−1). Where conditional step 1640 is not satisfied, the process returns to step 1634. Otherwise, the process advances to step 1642. Accordingly, in steps 1622 through 1640, the process sets discrete integer values for columns 3 and greater of the first row of the generic matrix.

With reference to FIG. 15C, the process sets the row number R to 2 in step 1642. Then, in step 1644, the process sets the column number C to 3. Next, the process determines in conditional step 1646 whether MATRIX(C−2, R)=(n−1). Where the condition in step 1646 is satisfied, the process advances to step 1648 to set MATRIX(C, R)=1. Otherwise, the process advances to step 1650 to set MATRIX(C, R)=MATRIX(C−2, R)+1. Subsequent to steps 1648 and 1650, the process advances to conditional step 1652 to determine whether MATRIX(C−1, R)=(n−1). Where the condition in step 1652 is satisfied, the process advances to step 1654 to set MATRIX (C+1, R)=1. Otherwise, the process advances to step 1656 to set MATRIX (C+1, R)=MATRIX(C−1, R)+1. Subsequent to steps 1654 and 1656, the process is promoted to step 1658 to increment column number C by 2. Then, in conditional step 1660, the process determines whether C>[2(n−1)]−1. Where the result of the condition in step 1660 is not satisfied, the process returns to conditional step 1646. Otherwise, the process increments the row number R by 1 in step 1662. Then, in conditional step 1664, the process determines whether R>n/2. Where the condition in step 1664 is not met, the process returns to step 1644. Otherwise, the process is terminated in step 1666.

Although the invention has been described herein with specific reference to embodiments thereof, it will be appreciated by those skilled in the art that various modifications, deletions, and alterations may be made to such preferred embodiment without departing from the spirit and scope of the invention. Accordingly, it is intended that all reasonably foreseeable additions, modifications, deletions and alterations be included within the scope of the invention as defined in the following claims.

What is claimed is:

1. A scheduling system comprising:
   an interface to an input device, the input device configured to receive a number n, the number n representing a quantity of discrete elements to be scheduled, the discrete elements being physical things; and
   a computer coupled to the interface, the computer including a generic algorithm module configured to output a single generic matrix associated with the n discrete elements, the single generic matrix being a schedule, the single generic matrix having a first axis associated with n−1 consecutive periods and a second axis associated with n/2 discrete element pairs in each of the n−1 consecutive periods, each of the n discrete elements being disposed in each of the n−1 consecutive periods, each of the discrete element pairs being a unique combination of two of the n discrete elements, each of the discrete element pairs having a first discrete element associated with a left-hand assignment and a second discrete element associated with a right-hand assignment, the single generic matrix being optimized in that a number of times that each of the n discrete elements is associated with the left-hand assignment differs by no more than one from a number of times that each of the n discrete elements is associated with the right-hand assignment, the single generic matrix being further optimized in that, for each of the n discrete elements, the association with the left-hand assignment and the right-hand assignment is alternated over the n−1 consecutive periods, except that each of the n discrete elements may be exclusively associated with two consecutive left-hand assignments or with two consecutive right-hand assignments, but not both, over the n−1 consecutive periods.

2. The scheduling system of claim 1, wherein the physical things include one of a person, a team of persons, and a manufactured article.

3. The scheduling system of claim 1, wherein the left-hand assignment represents a first physical location and the right-hand assignment represents a second physical location.

4. The scheduling system of claim 1, wherein the left-hand assignment represents a first feature of a manufactured article and the right-hand assignment represents a second feature of the manufactured article.

5. The scheduling system of claim 1, wherein the generic algorithm module is not configured to perform an iterative scheduling process to output the single generic matrix, and wherein the generic algorithm module is not configured to select the single generic matrix from a plurality of schedules.

6. A scheduling system comprising a computer, the computer including a generic algorithm module, the generic algorithm module configured to perform a process, the process including steps:
   a) receiving a number n, the number n representing a quantity of discrete elements to be scheduled, the number n being 5 or greater, the discrete elements being related to physical things;
   b) if n is an odd number, setting n=n+1;
   c) defining a matrix having 2(n−1) columns and n/2 rows, every two non-overlapping consecutive columns representing a time period, the 2(n−1) columns representing n−1 consecutive time periods, each position in the matrix capable of being uniquely addressed as MATRIX (C, R), where C is a column number and R is a row number, each position in the matrix configured to contain an integer value from the set of {1, 2 . . . n}, each of the integer values representing one of the discrete elements, each of the n/2 rows of each of the consecutive time periods representing a scheduled pair of discrete elements;
   d) setting MATRIX(1, 1)=1;
   e) setting MATRIX(2, 1)=n;
   f) setting MATRIX(1, 2)=MATRIX(2, 1)−1;
   g) setting MATRIX(2, 2)=MATRIX (1, 1)+1;
   h) setting the row number R to 3;
   i) setting MATRIX(1, R)=MATRIX(1, R −1)−2;
   j) setting MATRIX(2, R)=MATRIX(2, R−1)+2;
   k) setting the column number C to 3;
   l) setting MATRIX(C, 1)=n;
   m) setting MATRIX(C+3, 1)=n;
   n) setting the column number C to 4;
   o) setting a variable J to 2;
   p) setting MATRIX(C, 1)=J;
   q) setting MATRIX(C+1, 1)=J+1
   r) setting the row number R to 2;
   s) setting the column number C to 3;
   t) determining whether MATRIX(C−2, R)=(n−1);
   u) if MATRIX(C−2, R) is equal to (n−1), setting MATRIX (C, R)=1;
   v) if MATRIX(C−2, R) is not equal to (n−1), setting MATRIX(C, R)=MATRIX(C−2, R)+1
   w) determining whether MATRIX(C−1, R)=(n−1);
   x) if MATRIX(C−1, R) is equal to (n−1), setting MATRIX (C+1, R)=1;
   y) if MATRIX(C−1, R) is not equal to (n−1), setting MATRIX (C+1, R)=MATRIX(C−1, R)+1; and
   z) outputting the matrix, the matrix representing a schedule for the n discrete elements in the n−1 consecutive periods.

7. A scheduling system comprising:
   an interface to an input device, the input device configured to receive a number n, the number n representing a quantity of discrete elements to be scheduled, the discrete elements being physical things; and
   means for generating a single generic matrix associated with the n discrete elements, the means coupled to the interface, the single generic matrix being a schedule, the single generic matrix having a first axis associated with n−1 consecutive periods and a second axis associated with n/2 discrete element pairs in each of the n−1 consecutive periods, each of the n discrete elements being disposed in each of the n−1 consecutive periods, each of the discrete element pairs being a unique combination of two of the n discrete elements, each of the discrete element pairs having a first discrete element associated with a left-hand assignment and a second discrete element associated with a right-hand assignment, the single generic matrix being optimized in that a number of times that each of the n discrete elements is associated with the left-hand assignment differs by no more than one from a number of times that each of the n discrete elements is associated with the right-hand assignment.

8. The scheduling system of claim 7, wherein for each of the n discrete elements, the association with the left-hand assignment and the right-hand assignment is alternated over the n−1 consecutive periods, except that each of the n discrete elements may be exclusively associated with two consecutive left-hand assignments or with two consecutive right-hand assignments, but not both, over the n−1 consecutive periods.

9. The scheduling system of claim 7, wherein the physical things include one of a person, a team of persons, and a manufactured article.

10. The scheduling system of claim 7, wherein the left-hand assignment represents a first physical location and the right-hand assignment represents a second physical location.

11. The scheduling system of claim 7, wherein the left-hand assignment represents a first feature of a manufactured article and the right-hand assignment represents a second feature of the manufactured article.

12. The scheduling system of claim 1, wherein, in each of the n−1 consecutive periods, a first predetermined one of the n discrete elements is associated with a first one of the left-hand and right-hand assignments, and a second predetermined one of the n discrete elements is associated with an opposite one of the left-hand and right-hand assignments, the first and second predetermined ones of the n discrete elements being a non-conflict pair.

* * * * *